(12) United States Patent
Hamamoto et al.

(10) Patent No.: US 9,004,569 B2
(45) Date of Patent: Apr. 14, 2015

(54) DOOR TRIM STRUCTURE OF AUTOMOTIVE VEHICLE

(71) Applicant: Mazda Motor Corporation, Hiroshima (JP)

(72) Inventors: Katsuhiro Hamamoto, Hiroshima (JP); Keishi Nishimura, Hiroshima (JP); Kazuhisa Kodama, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/946,328

(22) Filed: Jul. 19, 2013

(65) Prior Publication Data
US 2014/0028044 A1 Jan. 30, 2014

(30) Foreign Application Priority Data

Jul. 30, 2012 (JP) ................................. 2012-168557

(51) Int. Cl.
*B60N 3/12* (2006.01)
*B60R 7/04* (2006.01)
*B60N 3/10* (2006.01)

(52) U.S. Cl.
CPC ............... *B60R 7/046* (2013.01); *B60N 3/101* (2013.01)

(58) Field of Classification Search
CPC .......... B60B 7/10; B60B 7/18; B60J 10/0051; B60J 10/02; B60J 10/0031; B63H 20/10; B60R 13/0206; E04F 13/06; E04F 2013/063
USPC ........................................ 296/37.13; 428/31
See application file for complete search history.

(56) References Cited

U.S. PATENT DOCUMENTS

| | | | | | |
|---|---|---|---|---|---|
| 4,619,477 | A | * | 10/1986 | Kneib et al. | 296/37.13 |
| 5,073,318 | A | * | 12/1991 | Rohrlach et al. | 264/46.5 |
| 5,628,441 | A | * | 5/1997 | Dykstra | 224/483 |
| D387,024 | S | * | 12/1997 | Hellhake et al. | D12/195 |
| 5,800,004 | A | * | 9/1998 | Ackeret | 296/37.13 |
| 6,116,672 | A | * | 9/2000 | Cannon et al. | 296/37.13 |
| 6,196,605 | B1 | * | 3/2001 | Baldas et al. | 296/37.13 |
| 6,655,563 | B2 | * | 12/2003 | Shimajiri | 224/282 |
| 6,926,332 | B2 | * | 8/2005 | Youngs et al. | 296/37.13 |
| 7,008,003 | B1 | * | 3/2006 | Hirose et al. | 296/146.7 |
| 7,073,843 | B2 | * | 7/2006 | Schoemann et al. | 296/146.7 |
| 7,111,894 | B2 | * | 9/2006 | Kora et al. | 296/146.1 |
| 7,150,550 | B2 | * | 12/2006 | Bogdan et al. | 362/501 |

(Continued)

FOREIGN PATENT DOCUMENTS

JP 2007-216700 A 8/2007
JP 2008-273426 A 11/2008

*Primary Examiner* — Kiran B Patel
(74) *Attorney, Agent, or Firm* — Studebaker & Brackett PC (57) ABSTRACT

A pocket member includes a flat-shaped first floor portion located forward and extending substantially horizontally and a flat-shaped second floor portion located in back of the first floor portion and rising obliquely rearward from the first floor portion. A trim recess portion recessed outward in a vehicle width direction is formed at a portion which is located above a trim opening portion and between a door armrest portion and a speaker storage portion which respectively protrude toward a vehicle-compartment side. The trim recess portion is configured to extend obliquely forward and upward from the trim opening portion along the direction substantially perpendicular to the second floor portion. Accordingly, an appropriate storage position of any stored bottle containers, regardless of its size (a large-sized one, a small-sized one) can be provided.

7 Claims, 7 Drawing Sheets

(56) References Cited

U.S. PATENT DOCUMENTS

| | | |
|---|---|---|
| 7,192,074 B2 * | 3/2007 | DePue et al. ................. 296/37.9 |
| 7,287,885 B2 * | 10/2007 | Radu et al. .................... 362/488 |
| 7,681,939 B2 * | 3/2010 | Augustyn .................. 296/146.7 |
| 8,109,559 B2 * | 2/2012 | Nakamori et al. ......... 296/146.7 |
| 8,141,933 B2 * | 3/2012 | Nakamura ................. 296/146.7 |
| 8,210,590 B1 * | 7/2012 | Moberg et al. ............. 296/37.13 |
| 2006/0061153 A1 * | 3/2006 | Hamamoto et al. ..... 297/188.04 |
| 2009/0051186 A1 * | 2/2009 | Augustyn .................. 296/37.13 |
| 2009/0091153 A1 * | 4/2009 | Pinkerton et al. .......... 296/37.13 |
| 2012/0299324 A1 * | 11/2012 | Langenbacher et al. ... 296/37.13 |
| 2014/0138978 A1 * | 5/2014 | Langenbacher et al. ... 296/37.13 |

\* cited by examiner

DOOR TRIM STRUCTURE OF AUTOMOTIVE VEHICLE

BACKGROUND OF THE INVENTION

The present invention relates to a door trim structure of an automotive vehicle, in which a pocket member is joined to a back face of a door trim having a trim opening portion formed at a door trim's lower portion so as to mach the trim opening portion and form a storage portion in the shape of a tube with a floor between the door trim and the pocket member.

Conventionally, it is known, as disclosed in Japanese Patent Laid-Open Publication No. 2008-273426, that a storage portion for storing a bottle container, such as a pet bottle, is provided at a door trim provided at an inside of a door for vehicle. In this patent document, a pocket portion is joined to a back face of a door trim having a trim opening portion formed at a door trim's lower portion so as to mach the trim opening portion and form a storage portion in the shape of a tube with a floor between the door trim and the pocket member.

In recent years, however, a small-sized bottle container having the capacity of about 350-500 mL and a large-sized bottle container having the capacity of about 1-2 L have become popular, so that there is a problem in that if a tall and large-sized bottle container is stored in the above-described storage portion in an upright position, for example, this large-sized bottle container may be difficult to be taken (picked) out of the storage portion because of its location close to other members (components) arranged at an upper portion of the door trim (an armrest, an inner handle, or the like, for example).

Then, Japanese Patent Laid-Open Publication No. 2007-216700 proposes a structure which comprises a storage portion to store a bottle container in a forward slant position for solving the above-described problem. Herein, a trim recess portion is formed between an armrest portion and a speaker storage portion storing a speaker, which extends obliquely forward, and a connection portion connecting the armrest portion and the speaker storage portion is provided so that the bottle container stored in the trim recess portion can be supported at the connection portion. Accordingly, the large-sized bottle container can be stored stably in the forward slant position, improving an easy taken-out operation of the large-sized bottle container.

However, since a small-sized bottle container may be also stored in its forward slant position according to the structure disclosed in the above-described second patent document, there is another problem in that a storage state of the small-sized bottle container may be inferior in appearance and also its taken-out operation may be difficult.

SUMMARY OF THE INVENTION

Accordingly, an object of the present invention is to provide a door trim structure of an automotive vehicle which can provide an appropriate storage position of any bottle container stored, regardless of its size (i.e., a large-sized one or a small-sized one).

According to the present invention, there is provided a door trim structure of an automotive vehicle, comprising a door trim provided at a vehicle-compartment side of a door body, the door trim having a trim opening portion which is formed at a lower portion of the door trim and opens upward, and a pocket member joined to a back face of the door trim so as to mach the trim opening portion and form a storage portion in the shape of a tube with a floor between the door trim and the pocket member, wherein the pocket member includes a flat-shaped first floor portion which is located forward and extends substantially horizontally and a flat-shaped second floor portion which is located in back of the first floor portion and rises obliquely rearward from the first floor portion, a trim recess portion which is recessed outward in a vehicle width direction is formed at a portion of the door trim which is located above the trim opening portion and between an armrest portion and a speaker storage portion which respectively protrude toward the vehicle-compartment side, and the trim recess portion is configured to extend obliquely forward and upward from the trim opening portion along a direction which is substantially perpendicular to the second floor portion of the pocket member.

According to the present invention, the small-sized bottle container can be stored substantially in the upright position by having its bottom placed onto the first floor portion of the pocket member. Thereby, the storage state of the small-sized bottle container can be superior (specifically, its good appearance and its easy taken-out operation). Further, the large-sized bottle container can be stored in the forward slant position by having its bottom placed onto the second floor portion of the pocket member and having its upper portion supported at the lower portion of the trim recess portion. Thereby, the storage state of the large-sized bottle container can be superior (specifically, its easy taken-out operation). Accordingly, the storage position of any bottle container stored can be appropriate, regardless of its size (i.e., a large-sized one or a small-sized one).

According to an embodiment of the present invention, the pocket member includes a side face portion which rises upward from the first and second floor portions, and the side face portion has a restriction portion which is configured to advance into a first upper space extending upward along a direction perpendicular to the first floor portion and to be formed along a peripheral edge portion of a second upper space extending obliquely upward and forward along another direction perpendicular to the second floor portion. Thereby, the upper portion of the stored small-sized bottle container can be supported at the restriction portion advancing into the first upper space, thereby restricting the position of the stored small-sized bottle container. Accordingly, the small-sized bottle container substantially in the upright position can be stored stably. Meanwhile, since the above-described restriction portion is formed along the peripheral edge portion of the second upper space, when the large-sized bottle container stored in the forward slant position is taken out of the storage portion, it can be avoided that the large-sized bottle container is caught by the restriction portion. Accordingly, the restriction portion may not hinder a smooth taken-out operation of the large-sized bottle container.

According to another embodiment of the present invention, the trim recess portion is configured such that a lower edge portion thereof is of an arch shape which projects upward along the speaker storage portion in a side view. Thereby, since the upper portion of the large-sized bottle container stored in the storage portion contacts the arc-shaped lower edge portion of the trim recess portion, the large-sized bottle container can be supported stably. Then, when it is taken out, the large-sized bottle container can be smoothly slid obliquely forward over and along the arc-shaped lower edge portion of the trim recess portion. Accordingly, the easy taken-out operation of the large-sized bottle container can be improved.

According to another embodiment of the present invention, a front side portion of the pocket member and a lower portion of the trim recess portion form a continuous face extending upward and forward. Thereby, a space for providing the first floor portion of the pocket member can be easily formed by forming the continuous face extending upward and forward.

According to another embodiment of the present invention, the pocket member includes a space expansion portion which expands rearward from an imaginary line connecting a rear end portion of the trim opening portion and a rear end portion of the second floor portion. When the large-sized bottle container stored in the forward slant position is taken out of the storage portion, the bottom of the large-sized bottle container tends to move upward and rearward. Herein, in a case in which the above-described space expansion portion is formed at the pocket member, the bottom of the large-sized bottle container can be allowed to move upward and rearward smoothly. Accordingly, the large-sized bottle container can be taken out easily without the bottom being caught by the rear portion of the pocket member.

According to another embodiment of the present invention, a boundary portion of the first and second floor portions is of a valley shape which extends straightly in a vehicle width direction. Thereby, since the bottom of the large-sized bottle container or the small-sized bottle container in the stored position can be caught by the boundary portion in the valley shape, any of the large-sized bottle container and the small-sized bottle container can be stored stably.

Other features, aspects, and advantages of the present invention will become apparent from the following description which refers to the accompanying drawings.

DETAILED DESCRIPTION OF THE INVENTION

Hereafter, a preferred embodiment of the present embodiment will be described specifically referring to the accompanying drawings.

Figure 1:
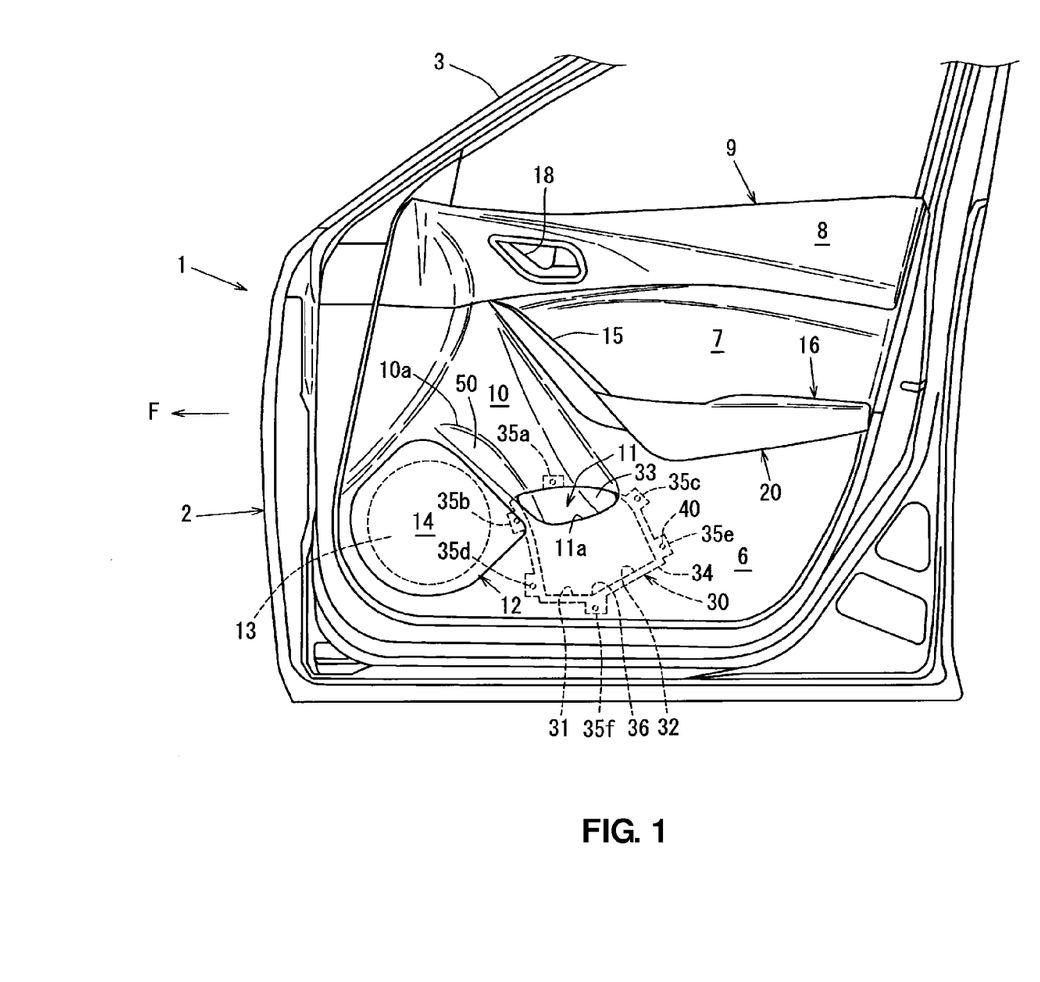
FIG. 1 is a side view of a right-side front door equipped with a door trim structure of an automotive vehicle of the present invention.
Figure 2:
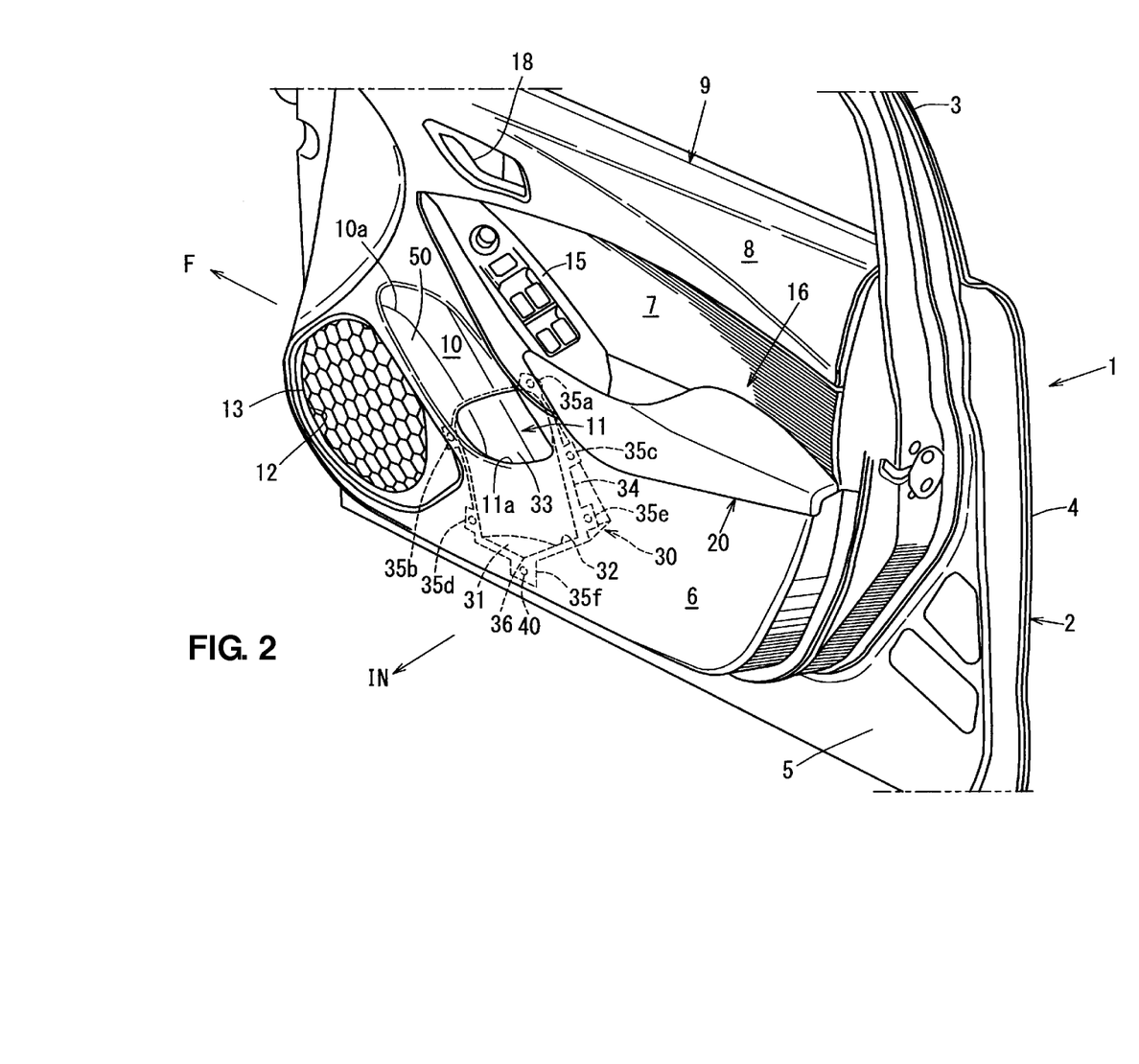
FIG. 2 is a perspective view of a main part of FIG. 1.

The drawings show a door trim structure of an automotive vehicle. FIG. 1 is a side view showing a right-side front door, when viewed from the inside of a vehicle compartment, and FIG. 2 is a perspective view of a main part of FIG. 1. In FIGS. 1 and 2, a front door 1 comprises a door body 2 and a door sash portion 3, and the door body 2 comprises a door outer panel 4 and a door inner panel 5. Door-trim base materials 6, 7, 8 are provided at a vehicle-compartment side of the door body 2. In the present embodiment, a door trim 9 is comprised of, but not limited to, the plural door-trim base materials 6, 7, 8: the first door-trim base material 6 which is located on a lower side; the second door-trim base material 7 which is located on a middle side; and the third door-trim base material 8 which is located on an upper side.

At a front portion of the first door-trim base material 6 are formed a trim recess portion 10 which extends obliquely forward and upward and is recessed outward in a vehicle width direction and a pocket member 11 as a storage portion which is continuous to the above-described trim recess portion 10. A speaker 13 is stored at a speaker storage portion 12 which is provided at a front lower portion of the trim recess portion 10, and a vehicle-compartment side of the speaker 13 is covered with a cover member 14. A lower edge portion 10a of the trim recess portion 10 is of an arc shape which projects upward along the speaker storage portion 12 in a side view.

The second door-trim base material 7 is configured such that it curves gradually outward in the vehicle width direction from its upper portion to its lower portion. A shell portion 15 which extends obliquely forward and upward is formed between a front portion of the second door-trim base material 7 and the trim recess portion 10 of the first door-trim base material 6. Switches for operating window glasses and the like are arranged at the shell portion 5.

A door armrest portion 16 which protrudes toward the inside of the vehicle compartment from a lower portion of the second door-trim base material 7 is formed between an upper portion of a rear part of the first door-trim base material 6 and the lower portion of the second door-trim base material 7. The door armrest portion 16, which is separate from the door-trim base materials 6, 7, 8, is comprised of an armrest cover portion 20 which covers an opening portion (not illustrated) of the door-trim base materials 6, 7. Further, a door inner handle 18 which releases a door lock is arranged at a front portion of the third door-trim base material 8.

A trim opening portion 11a which forms an opening portion of the pocket portion 11 is formed at a lower face portion of the first door-trim base material 6, and a pocket member 30, as a separate member, is arranged so as to correspond to the trim opening portion 11a. The above-described trim recess portion 10, which is located above the trim opening portion 11a, is formed between the door armrest portion 16 and the speaker storage portion 12.

Figure 3:
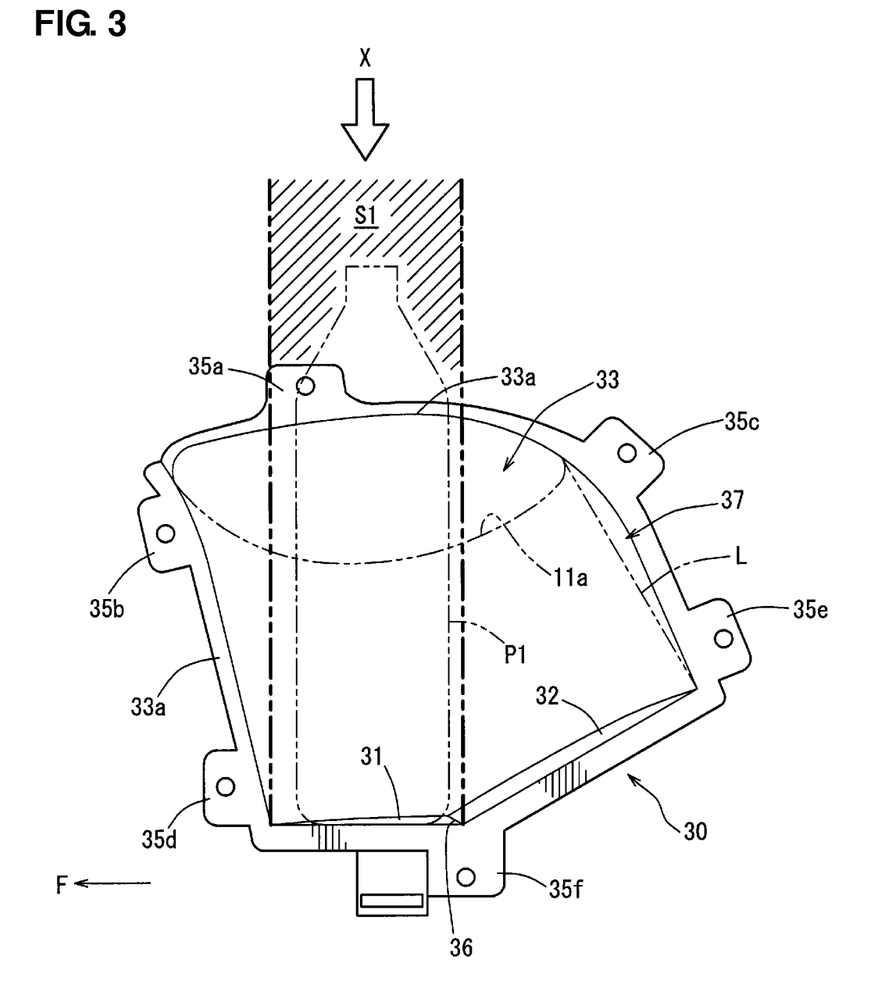
FIG. 3 is a side view showing a state in which a small-sized bottle container is stored.
Figure 4:
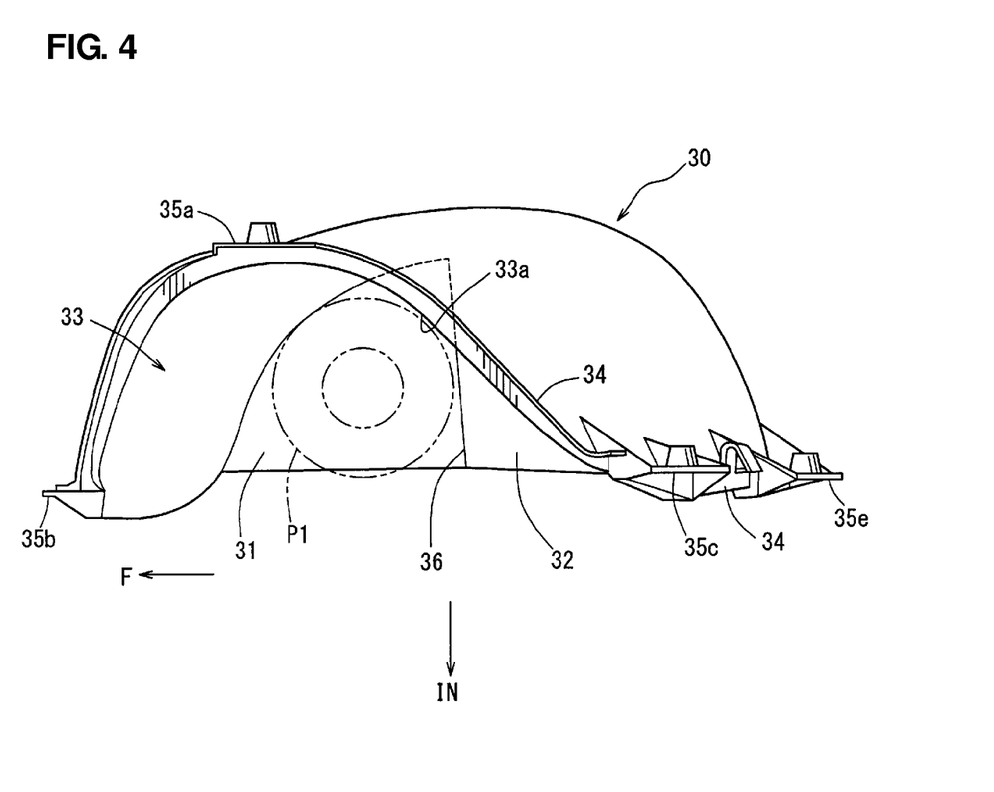
FIG. 4 is a view from an X direction of FIG. 3.
Figure 5:
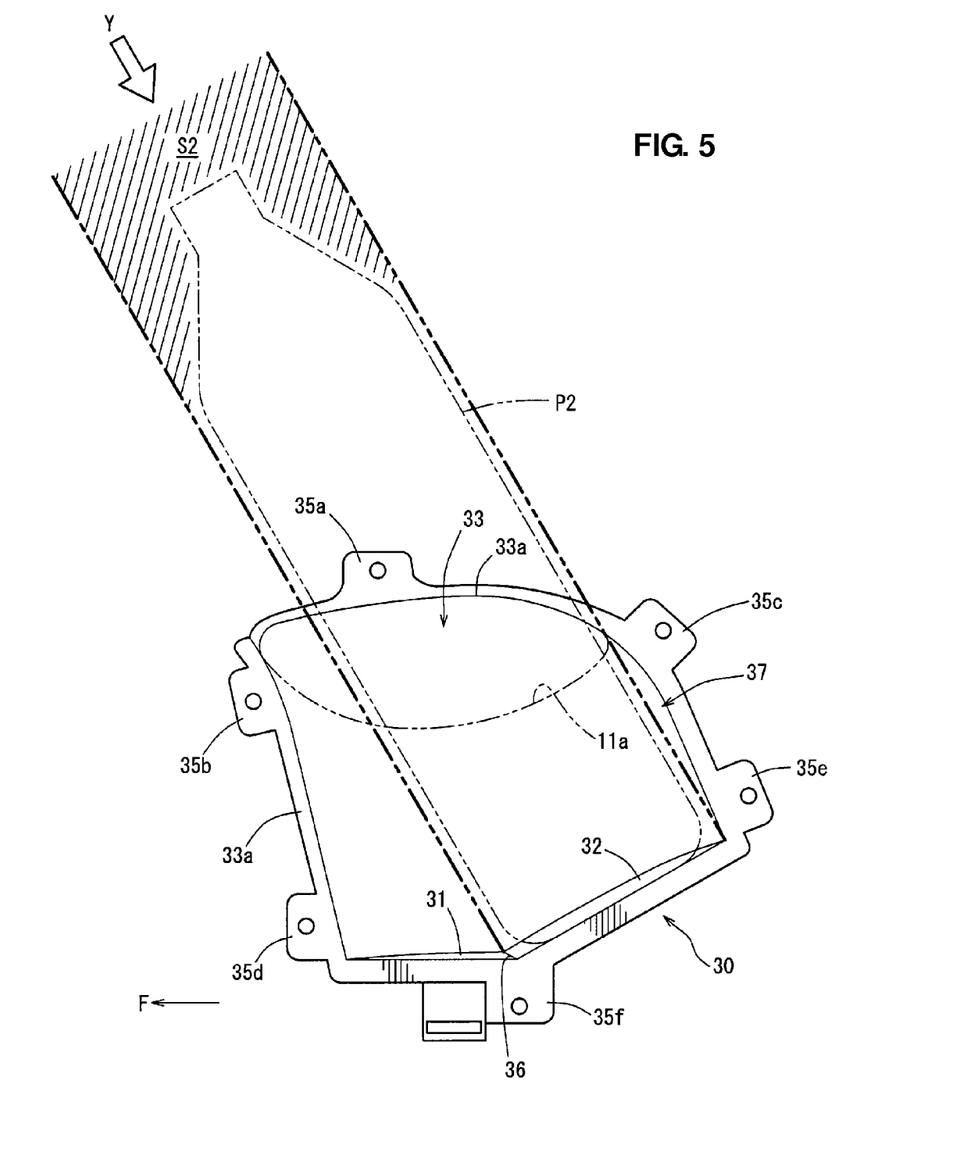
FIG. 5 is a side view showing a state in which a large-sized bottle container is stored.
Figure 6:
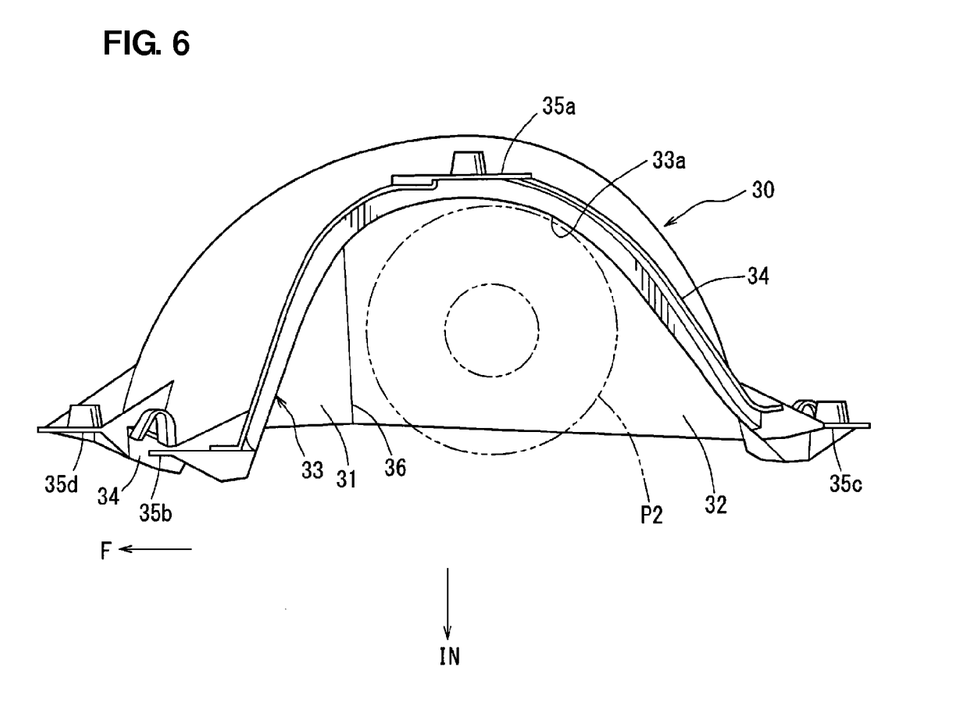
FIG. 6 is a view from a Y direction of FIG. 5.
Figure 7:
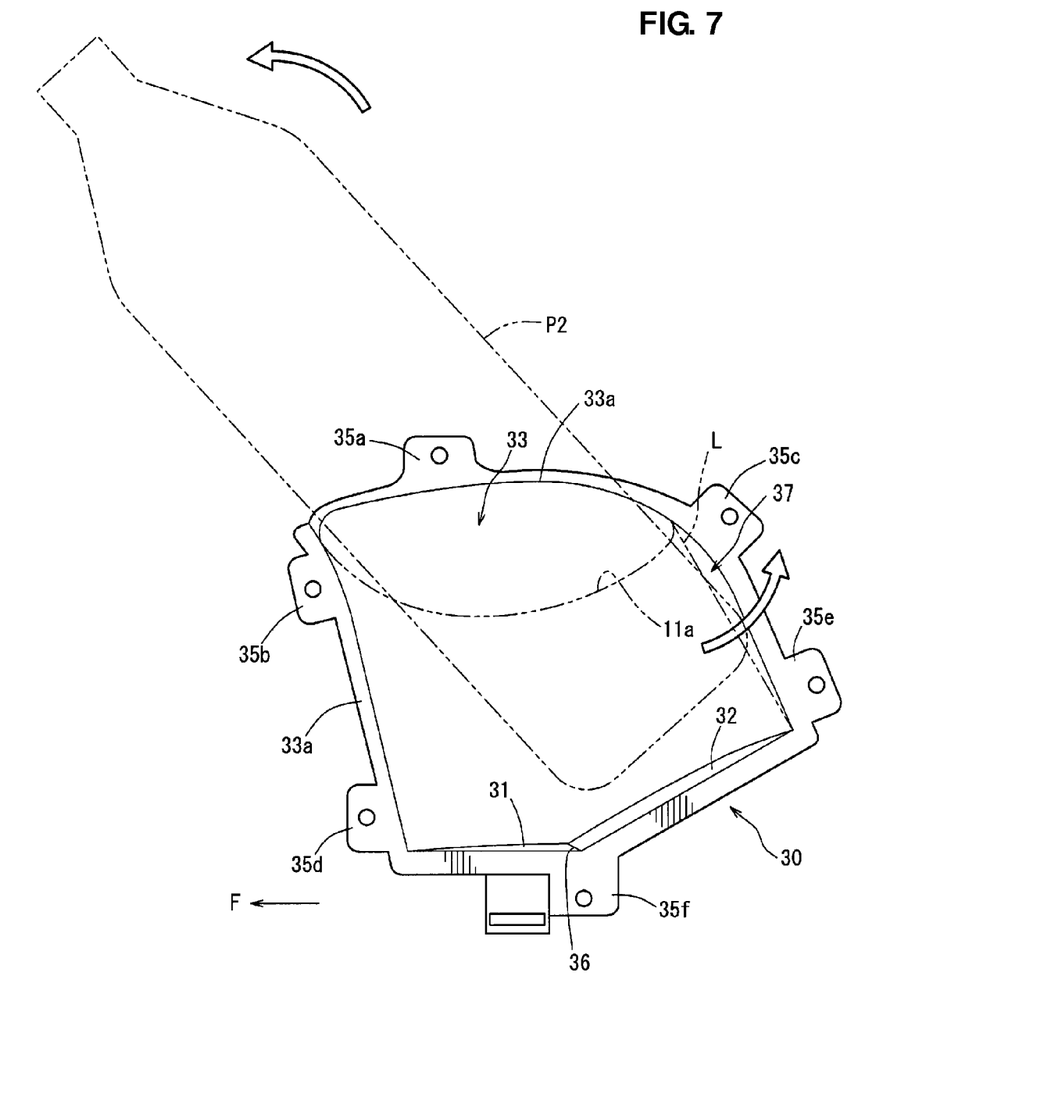
FIG. 7 is a side view showing a state in which the large-sized bottle container is taken out of a storage portion.

FIG. 3 is a side view showing a state in which a small-sized bottle container is stored, FIG. 4 is a view from an X direction of FIG. 3, which is a plan view of the pocket member when viewed from an upper position facing to a first floor, FIG. 5 is a side view showing a state in which a large-sized bottle container is stored, FIG. 6 is a view from a Y direction of FIG. 5, which is a plan view of the pocket member when viewed from a front position facing to a second floor, and FIG. 7 is a side view showing a state in which the large-sized bottle container is taken out of a storage portion. In FIGS. 1-7, the pocket member 30 is made from resin and integrally formed by first and second floor portions 31, 32 which will be described, a side face portion 33 which rises upward from a portion of an edge portion of the first and second floor portion 31, 32 except another portion of the above-described edge portion located on the vehicle-compartment side, a flange portion 34 which is formed along the above-described other portion of the edge portion of the first and second floor portion 31, 32 and an edge portion of the side face portion 33, and plural joint pieces 35a-35f which project from the flange portion 34.

The pocket member 30 is, as shown in FIGS. 1-7, is configured to open to the inside of the vehicle compartment and joined to a back face (an outward face in the vehicle width direction) of the first door-trim base material 6 so as to match the trim opening portion 11a, which forms the pocket portion 11 in the shape of a tube with a floor.

Specifically, an upper edge portion of the side face portion 33 is formed along the trim opening portion 11a, and the upper-side joint pieces 35a-35c are arranged at an outward portion in the vehicle width direction, a front portion, and a rear portion, respectively, along the trim opening portion 11a. These joint pieces 35a-35c are joined to a back face of the first door-trim base material 6 by joint members 40, such as clips, whereby the pocket member 30 is joined so as to match the trim opening portion 11a.

Further, the lower-side joint pieces 35d-35f are arranged at a lower portion of the trim opening portion 11a, which are joined to the back face of the first door-trim base material 6 by the joint members 40, whereby the floor portions 31, 32 of the pocket member 30 are supported at the lower portion of the first door-trim base material 6.

The pocket member 30 comprises the first floor portion 31 which is located forward and extends substantially horizontally and the flat-shaped second floor portion 32 which is located in back of the first floor portion 31 and rises obliquely rearward from the first floor portion 31, and a boundary portion 36 of the first floor portion 31 and the second floor portion 32 is of a valley shape which extends straightly in the vehicle width direction. Further, the trim recess portion 10 is configured to extend obliquely forward and upward from the trim opening portion 11a along a direction which is substantially perpendicular to the second floor portion 32 as shown in FIGS. 1 and 2.

Further, the pocket member 30 has a restriction portion 33a at an upper edge portion of the side face portion 33. This restriction portion 33a is formed at a position which overlaps part of the first floor portion 31 as shown in FIG. 4 when the pocket member 30 is viewed from an upper position facing to the first floor portion 31 (an X direction indicated in a bold arrow shown in FIG. 3). In other words, the restriction portion 33a is configured to advance into a first upper space (a space partitioned by bold two-dotted broken lines shown in FIG. 3) S1 which extends upward along a direction perpendicular to the first floor portion 31.

Further, the restriction portion 33a is formed along a peripheral edge portion of the second floor portion 32 as shown in FIG. 6 when the pocket member 30 is viewed from an obliquely-forward position facing to the second floor portion 32 (a Y direction indicated in a bold arrow shown in FIG. 5). In other words, the restriction portion 33a is configured to be formed along a peripheral edge portion of a second upper space (a space partitioned by bold two-dotted broken lines shown in FIG. 5) S2 which extends obliquely upward and forward along another direction perpendicular to the second floor portion 32.

Moreover, as shown in FIGS. 1 and 2, a continuous face 50 which extends upward and forward is formed by a front side portion of the pocket member 30 and a lower portion of the trim recess portion 10, and a space expansion portion 37 which expands rearward from an imaginary line L (indicated by a two-dotted broken line shown in FIGS. 3 and 7) which connects a rear end portion of the trim opening portion 11a and a rear end portion of the second floor portion 32 is formed at a rear side portion of the pocket member 30.

According to the present embodiment, in a case in which a small-sized bottle container P1 (the capacity of about 350-500 mL) indicated by a two-dotted broken line shown in FIGS. 3 and 4 is stored in the pocket portion 11, the small-sized bottle container P1 can be stored substantially in the upright position by having its bottom placed onto the first floor portion 31 as shown.

In the storage state of the small-sized bottle container P1, the position of the bottom of the small-sized bottle container P1 is restricted by the edge portion and the boundary portion 36 of the first floor portion 31, and also an upper portion of the small-sized bottle container P1 near a bottle neck is supported at the restriction portion 33a of the side face portion 33 so that the position of the upper portion of the small-sized bottle container P1 can be restricted. Accordingly, the small-sized bottle container P1 stored in substantially in the upright position can be stable despite vibrations of the vehicle or the like.

Meanwhile, in a case in which a large-sized bottle container P2 (the capacity of about 1-2 L) indicated by a two-dotted broken line shown in FIGS. 5-7 is stored in the pocket portion 11, the large-sized bottle container P2 can be stored in a forward slant position by having its bottom placed onto the second floor portion 32 as shown.

In the storage state of the large-sized bottle container P2, the position of the bottom of the large-sized bottle container P2 is restricted by the edge portion and the boundary portion 36 of the second floor portion 32, and also an upper portion of the large-sized bottle container P2 is supported at the lower portion of the trim recess portion 10 which extends obliquely forward and upward from the trim opening portion 11a along a direction which is substantially perpendicular to the second floor portion 32 so that the position of the upper portion of the large-sized bottle container P2 can be restricted. Accordingly, the large-sized bottle container P2 stored in the forward slant position can be stable despite vibrations of the vehicle or the like.

When the large-sized bottle container P2 stored in the forward slant position is taken out, the bottom of the large-sized bottle container P2 tends to move upward and rearward as indicated by a bold arrow shown in FIG. 7. Herein, since the above-described space expansion portion 37 is formed at the pocket member 30, the large-sized bottle container P2 can be taken out easily without the bottom being caught by a rear portion of the pocket member 30.

Further, since the above-described restriction portion 33a is formed along the peripheral edge portion of the second upper space S2, when the large-sized bottle container P2 is taken out, it can be avoided that the large-sized bottle container P2 is caught by the restriction portion 33a. Accordingly, the restriction portion 33a may not hinder a smooth taken-out operation of the large-sized bottle container P2. In the figures, an arrow F shows a forward direction of the vehicle, and an arrow IN shows an inward direction in the vehicle width direction.

As described above, the door trim structure of an automotive vehicle of the present embodiment comprises the door trim 9 provided at the vehicle-compartment side of the door body 2, the door trim 9 having the trim opening portion 11a which is formed at the lower portion of the door trim 9 and opens upward, and the pocket member 30 joined to the back face of the door trim 9 so as to mach the trim opening portion 11a and form the pocket portion 11 in the shape of the tube with the floor between the door trim 9 and the pocket member 30, wherein the pocket member 30 includes the flat-shaped first floor portion 31 which is located forward and extends substantially horizontally and the flat-shaped second floor portion 32 which is located in back of the first floor portion 31 and rises obliquely rearward from the first floor portion 31, the trim recess portion 10 which is recessed outward in the vehicle width direction is formed at the portion of the door trim which is located above the trim opening portion 11a and between the armrest portion 16 and the speaker storage portion 12 which respectively protrude toward the vehicle-compartment side, and the trim recess portion 10 is configured to extend obliquely forward and upward from the trim opening portion 11a along the direction which is substantially perpendicular to the second floor portion 32 of the pocket member 30 (see FIGS. 1 and 2).

According to the present embodiment, the small-sized bottle container P1 can be stored substantially in the upright position by having its bottom placed onto the first floor portion 31 of the pocket member 30. Thereby, the storage state of the small-sized bottle container P1 can be superior (specifically, its good appearance and its easy taken-out operation). Further, the large-sized bottle container P2 can be stored in the forward slant position by having its bottom placed onto the second floor portion 32 of the pocket member 30 and having its upper portion supported at the lower portion of the trim recess portion 10. Thereby, the storage state of the large-sized bottle container P2 can be superior (specifically, its easy taken-out operation). Accordingly, the storage position of any bottle container stored can be appropriate, regardless of its size (the large-sized one P2 or the small-sized one P1). The pocket member 30 includes the side face portion 33 which rises upward from the first and second floor portions 31, 32, and the side face portion 33 has the restriction portion 33a which is configured to advance into the first upper space S1 extending upward along the direction perpendicular to the first floor portion 31 and to be formed along the peripheral edge portion of the second upper space S2 extending obliquely upward and forward along the direction perpendicular to the second floor portion 32 (see FIGS. 3-7).

Thereby, the upper portion of the stored small-sized bottle container P1 can be supported at the restriction portion 33a advancing into the first upper space S1, thereby restricting the position of the stored small-sized bottle container P1. Accordingly, the small-sized bottle container P1 substantially in the upright position can be stored stably. Meanwhile, since the above-described restriction portion 33a is formed along the peripheral edge portion of the second upper space S2, when the large-sized bottle container P2 stored in the forward slant position is taken out, it can be avoided that the large-sized bottle container P2 is caught by the restriction portion 33a. Accordingly, the restriction portion 33a may not hinder a smooth taken-out operation of the large-sized bottle container P2. Further, the trim recess portion 10 is configured such that the lower edge portion 10a is of the arch shape which projects upward along the speaker storage portion 12 in the side view (see FIGS. 1 and 2).

Thereby, since the upper portion of the large-sized bottle container P2 stored in the pocket portion 11 contacts the arc-shaped lower edge portion 10a of the trim recess portion 10, the large-sized bottle container P2 can be supported stably. Then, when it is taken out, the large-sized bottle container P2 can be smoothly slid obliquely forward over and along the arc-shaped lower edge portion 10a of the trim recess portion 10. Accordingly, the easy taken-out operation of the large-sized bottle container P2 can be improved. Further, the front side portion of the pocket member 30 and the lower portion of the trim recess portion 10 form the continuous face 50 extending upward and forward (see FIGS. 1 and 2).

Thereby, a space for providing the first floor portion 31 of the pocket member 30 can be easily formed by forming the continuous face 50 extending upward and forward. Further, the pocket member 30 includes the space expansion portion 37 which expands rearward from the imaginary line L connecting the rear end portion of the trim opening portion 11a and the rear end portion of the second floor portion 32 (see FIGS. 3, 5 and 7).

When the large-sized bottle container P2 stored in the forward slant position is taken out, the bottom of the large-sized bottle container P2 tends to move upward and rearward. Herein, in the case in which the above-described space expansion portion 37 is formed at the pocket member 30, the bottom of the large-sized bottle container P2 can be allowed to move upward and rearward smoothly. Accordingly, the large-sized bottle container P2 can be taken out easily without the bottom being caught by the rear portion of the pocket member 30. Further, the boundary portion 36 of the first and second floor portions 31, 32 is of the valley shape which extends straightly in the vehicle width direction (see FIGS. 1-7).

Thereby, since the bottom of the large-sized bottle container P2 or the small-sized bottle container P1 in the stored position can be caught by the boundary portion 36 in the valley shape, any of the large-sized bottle container P2 and the small-sized bottle container P1 can be stored stably.

While the pocket portion 11 is formed by the lower portion of the first door-trim base material 6 and the pocket member 30 in the present embodiment, another structure may be applied. For example, a pocket member in the shape of a tube with a floor may be used, and the pocket portion may be formed by this pocket member.

While the storage portion of the present invention corresponds to the pocket portion 11, the present invention should not be limited to the above-described embodiment, and any other modifications or improvements may be applied within the scope of a spirit of the present invention.

What is claimed is:

1. A door trim structure of an automotive vehicle, comprising:
    a door trim provided at a vehicle-compartment side of a door body, the door trim having a trim opening portion which is formed at a lower portion of the door trim and opens upward; and
    a pocket member joined to a back face of the door trim so as to form a storage portion in the shape of a tube with a floor between the door trim and the pocket member,
    wherein said pocket member includes a flat-shaped first floor portion which is located forward and extends substantially horizontally and a flat-shaped second floor portion which is located in back of the first floor portion and rises obliquely rearward from the first floor portion,
    a trim recess portion which is recessed outward in a vehicle width direction is formed at a portion of the door trim which is located above said trim opening portion and between an armrest portion and a speaker storage portion which respectively protrude toward the vehicle-compartment side, and
    said trim recess portion is configured to extend obliquely forward and upward from said trim opening portion along a direction which is substantially perpendicular to said second floor portion of the pocket member.

2. The door trim structure of an automotive vehicle of claim 1, wherein said pocket member includes a side face portion which rises upward from said first and second floor portions, and the side face portion has a restriction portion which is configured to advance into a first upper space extending upward along a direction perpendicular to the first floor portion and to be formed along a peripheral edge portion of a second upper space extending obliquely upward and forward along another direction perpendicular to the second floor portion.

3. The door trim structure of an automotive vehicle of claim 2, wherein said trim recess portion is configured such that a lower edge portion thereof is of an arch shape which projects upward along said speaker storage portion in a side view.

4. The door trim structure of an automotive vehicle of claim 2, wherein a front side portion of said pocket member and a lower portion of said trim recess portion form a continuous face extending upward and forward.

5. The door trim structure of an automotive vehicle of claim 3, wherein a front side portion of said pocket member and a lower portion of said trim recess portion form a continuous face extending upward and forward.

6. The door trim structure of an automotive vehicle of claim 3, wherein said pocket member includes a space expansion portion which expands rearward from an imaginary line connecting a rear end portion of said trim opening portion and a rear end portion of said second floor portion.

7. The door trim structure of an automotive vehicle of claim 1, wherein a boundary portion of said first and second floor portions is of a valley shape which extends straightly in a vehicle width direction.

* * * * *